United States Patent
Kajiwara

(10) Patent No.: US 6,233,355 B1
(45) Date of Patent: May 15, 2001

(54) ENCODING APPARATUS AND METHOD AND STORAGE MEDIUM

(75) Inventor: Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,120

(22) Filed: Mar. 30, 1998

(30) Foreign Application Priority Data

Apr. 2, 1997 (JP) .................................................. 9-083806
Mar. 13, 1998 (JP) ................................................ 10-062901

(51) Int. Cl.[7] .................................................. G06K 9/36
(52) U.S. Cl. .......................... 382/238; 382/232; 348/400; 386/109
(58) Field of Search ..................................... 382/238, 232; 348/400, 409, 410, 416; 386/109, 111

(56) References Cited

U.S. PATENT DOCUMENTS

| | | | |
|---|---|---|---|
| 3,984,626 | * 10/1976 | Mounts et al. ............................ | 178/6 |
| 4,870,695 | * 9/1989 | Gonzales et al. ..................... | 382/232 |
| 4,939,583 | * 7/1990 | Tsuboi et al. ....................... | 358/261.1 |
| 5,333,012 | * 7/1994 | Singhal et al. ........................ | 348/405 |
| 5,412,429 | * 5/1995 | Glover ................................ | 348/398 |
| 5,561,464 | * 10/1996 | Park .................................... | 348/397 |
| 5,647,049 | * 7/1997 | Odaka et al. ......................... | 386/124 |
| 5,650,822 | * 7/1997 | Heisler et al. ....................... | 348/402 |
| 5,825,424 | * 10/1998 | Canfield et al. ..................... | 348/416 |
| 5,960,116 | * 9/1999 | Kajiwara .............................. | 382/238 |

OTHER PUBLICATIONS

Pillai et al., "A New Spectrum Extension Method That Maximizes the Multistep Minimum Prediction Error–Generalization of the Maximum Entropy Concept", IEEE Transactions on Signal Processing, vol. 40 No. 1, pp. 142–158, Jan. 1992.*

Hepper, "Efficiency Analysis and Application of Uncovered Background Prediction in a Low Bit Rate Image Coder", IEEE Transactions on Communications, vol. 38 No. 9, pp. 1578–1584, Sep. 1990.*

* cited by examiner

*Primary Examiner*—Jose L. Couso
*Assistant Examiner*—Anh Hong Do
(74) *Attorney, Agent, or Firm*—Fitzpatrick, Cella, Harper & Scinto

(57) ABSTRACT

An encoding apparatus for encoding a target pixel, comprising a prediction value generator for generating a prediction value by predicting a target pixel value representing the target pixel on the basis of pixels around the target pixel, a difference generator for generating a difference between the prediction value generated by the prediction value generator and the target pixel value, and a quantizer for generating a quantized value by quantizing the difference generated by the difference generator. An entropy encoder generates encoded data by entropy-encoding the quantized value generated by the quantizer, and a quantization controller selects one of k quantization methods, for use by the quantizer, in accordance with a code amount of the encoded data generated by the entropy encoder. Each of the k quantization methods is a quantization method which makes an error between the difference generated by the difference generation means and a quantized value obtained by quantizing the difference using the quantizer fall within a range of $-N_m$ to $+N_m$ (m=1 to k).

3 Claims, 4 Drawing Sheets

| Q(D) | N = 0 | N = 1 | N = 2 | N = 3 |
|---|---|---|---|---|
| 0 | 000 | 00 | 00 | 0 |
| -1 | 001 | 010 | 01 | 10 |
| 1 | 010 | 011 | 100 | 110 |
| -2 | 011 | 100 | 101 | 11100 |
| 2 | 1000 | 1010 | 1100 | 11101 |
| -3 | 1001 | 1011 | 1101 | 11110 |
| 3 | 1010 | 1100 | 11101 | 1111100 |
| ⋮ | ⋮ | ⋮ | ⋮ | ⋮ |

FIG. 5

| N \ \|S\| | 0 | 1 | 2 | 3 |
|---|---|---|---|---|
| 0 | 3 | 2 | 1 | 0 |
| 1, 3, 9 | 4 | 3 | 2 | 1 |
| 2, 4, 5, 6, 7, 8, 10, 11, 12 | 5 | 4 | 3 | 2 |
| 13 | 6 | 5 | 4 | 3 |

FIG. 6

| QL \ S | 0 | -12 TO -1, 1 TO 12 | -13, 13 |
|---|---|---|---|
| 0 | 0 | 0 | 0 |
| 1 | 0 | 0 | 1 |
| 2 | 0 | 1 | 1 |
| 3 | 1 | 1 | 1 |
| 4 | 1 | 1 | 2 |
| 5 | 1 | 2 | 2 |
| 6 | 2 | 2 | 2 |
| 7 | 2 | 2 | 3 |
| 8 | 2 | 3 | 3 |
| 9 | 3 | 3 | 3 |

ENCODING APPARATUS AND METHOD AND STORAGE MEDIUM

BACKGROUND OF THE INVENTION

1. Field of the Invention

The present invention relates to an encoding apparatus and method of efficiently encoding an image and a storage medium storing the method.

2. Related Background Art

Predictive encoding is available as one conventional encoding scheme used in an encoding apparatus. In the predictive encoding, when the value of a pixel to be encoded (target pixel) is encoded, a predictive value is generated on the basis of the values of pixels around the target pixel, and the difference (prediction error) between the value of the target pixel and the prediction value is entropy-encoded.

In improved predictive encoding, a plurality of so-called prediction schemes of generating a prediction value from neighboring pixels are prepared, and these prediction schemes are adaptively used to generate an optimal prediction value, thereby entropy-encoding the difference between the prediction value and the value of the target pixel.

In the above conventional predictive encoding scheme of generating the prediction value on the basis of a plurality of neighboring pixels, no technique has been available to suppress the amount of encoded data generated by this encoding to an amount near to a predetermined amount. Furthermore, there has been room for development of an effective technique of minimizing any deterioration in the quality of the image represented by the above encoded data.

SUMMARY OF THE INVENTION

The present invention has been made in consideration of the above problems, and has as its object to provide an encoding technique of controlling the amount of encoded data to an amount as near to a predetermined amount as possible in an apparatus for entropy-encoding the difference (prediction error) between a prediction value and a target pixel. It is another object of the present invention to minimize any deterioration in image quality while limiting the amount of encoded data to a predetermined data amount.

In order to achieve the above objects, according to a preferred embodiment of the present invention, there is provided an encoding apparatus for encoding a target pixel, comprising prediction means for generating a prediction value by predicting a target pixel value representing the target pixel on the basis of pixels around the target pixel, difference generation means for generating a difference between the prediction value generated by the prediction means and the target pixel value, quantization means for generating a quantized value by quantizing the difference generated by the difference generation means, entropy encoding means for generating encoded data by entropy-encoding the quantized value generated by the quantization means, and quantization control means for selecting a quantization method for the quantization means in accordance with a code amount of the encoded data generated by the entropy encoding means.

It is still another object of the present invention to limit the deterioration in image quality to a predetermined degree in units of target pixels.

In order to achieve the above objects, according to another preferred embodiment of the present invention, there is provided an encoding apparatus for encoding a target pixel, comprising prediction means for generating a prediction value by predicting a target pixel value representing the target pixel on the basis of pixels around the target pixel, difference generation means for generating a difference between the prediction value generated by the prediction means and the target pixel value, quantization means for generating a quantized value by quantizing the difference generated by the difference generation means, entropy encoding means for generating encoded data by entropy-encoding the quantized value generated by the quantization means, and quantization control means for selecting one of k quantization methods which is to be used for the quantization means in accordance with a code amount of the encoded data generated by the entropy encoding means, wherein each of the k quantization methods is a method of performing quantization such that an error between the difference generated by the difference generation means and a quantized value obtained by quantizing the difference using the quantization means falls within a range of $-N_m$ to $+N_m$ ($m=1$ to $k$).

The above and other objects, features, and advantages of the present invention will be apparent from the following detailed description in conjunction with the accompanying drawings and the appended claims.

BRIEF DESCRIPTION OF THE DRAWINGS

FIG. 5 is a view showing the arrangement of a prediction conversion circuit; and FIG. 6 is a view showing the arrangement of a code prediction inverting circuit.

DETAILED DESCRIPTION OF THE PREFERRED EMBODIMENTS

The present invention will be described in detail with reference to the accompanying drawings.

Figure 1:
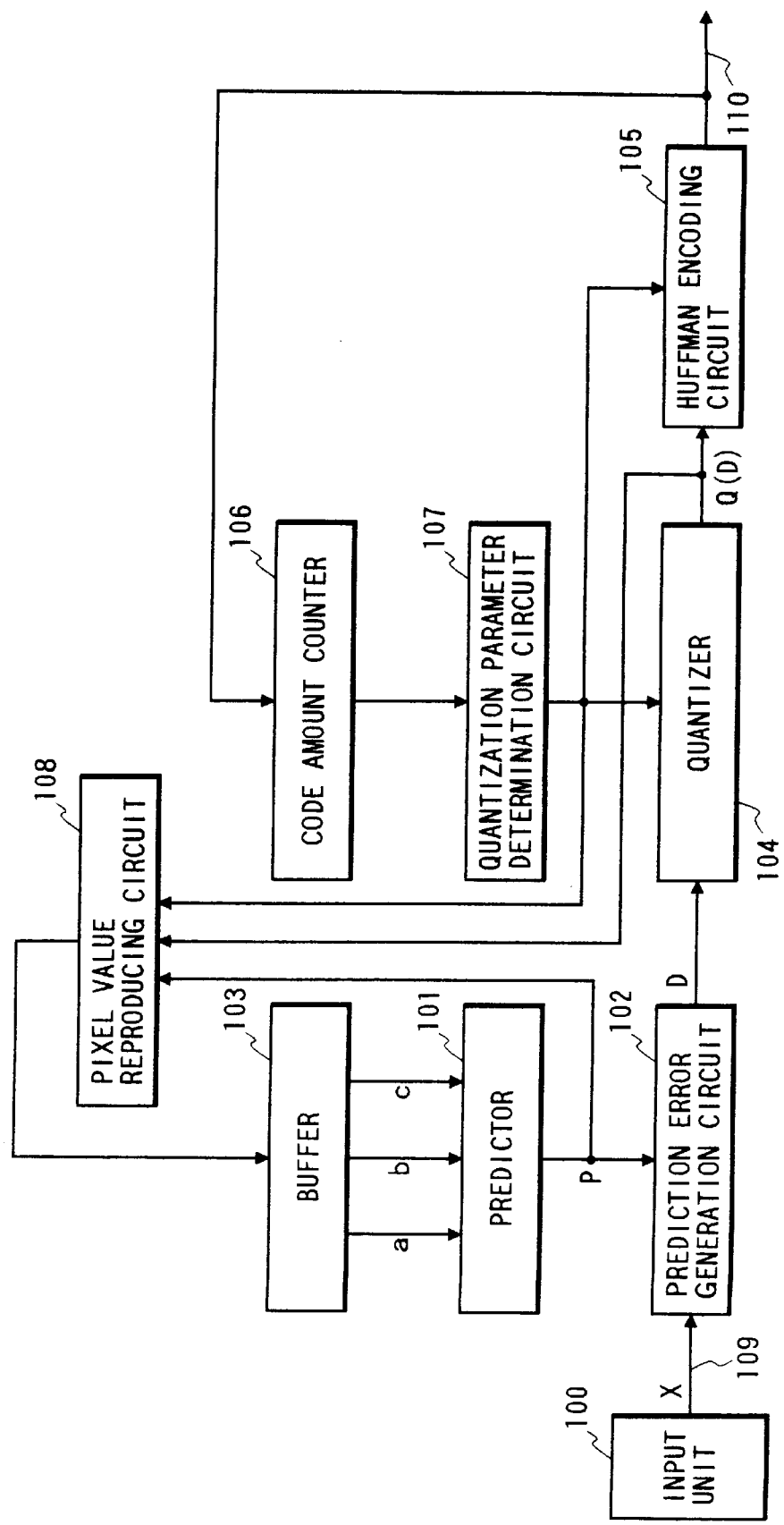
FIG. 1 is a block diagram showing the first embodiment of the present invention.

FIG. 1 shows the arrangement of the first embodiment of the present invention. Referring to FIG. 1, this embodiment includes an input unit 100 for inputting image data, a predictor 101, a prediction error generation circuit 102, a buffer 103 for storing 2-line image data, a quantizer 104, a Huffman encoding circuit 105, a code amount counter 106, a quantization parameter determination circuit 107, a pixel value reproducing circuit 108, and signal lines 109 and 110.

The operations of the respective components of this embodiment will be sequentially described next in a case wherein an 8-bit (0 to 255) monochrome image having a size of X pixels (horizontal)×Y pixels (vertical) is encoded. The present invention is not limited to this and can be applied to a case wherein a multivalued color image consisting of 8-bit R, G, and B color components or 8-bit L, a, and b luminance-chromaticity components is encoded. In this case, it suffices if each component is encoded in the same manner as the above monochrome image signal.

Encoding for the respective components may be switched in units of frames. In this case, the overall state of an image can be checked in advance on the decoding side. In addition, encoding the respective components may be switched in units of pixels, lines, or bands each consisting of a plurality of lines. In this case, a complete color image can be partly seen in advance.

It is an object of image encoding in this embodiment to control the generated code amount per pixel to TL bits or less. When a multivalued color image is to be encoded, it suffices if the code amount of each component is controlled to TL bits or less.

First of all, pixels to be encoded (target pixels) are input from the input unit 100 in the raster scan order and input to the prediction error generation circuit 102 through the signal line 109.

The buffer 103 stores 2-line pixels, i.e., 1-line target pixels and preceding 1-line pixels, output from the pixel value reproducing circuit 108. At the start of encoding, all the values in the buffer are set to 0.

Figures 2, 3:
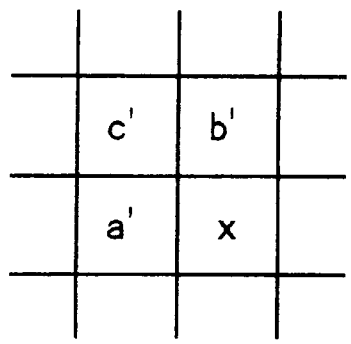
FIG. 2 is a view showing the positional relationship between a pixel to be encoded and neighboring pixels.
FIG. 3 is a view showing Huffman tables.

First of all, the predictor 101 extracts reconstructed pixel values a, b, and c corresponding to pixels around a target pixel from the buffer 103. FIG. 2 shows positions a', b', and c' of the neighboring pixels a, b, and c with respect to a target pixel x. These neighboring pixels a', b', and c' are encoded pixels with respect to the target pixel x. In addition, these reconstructed pixel values are pixel values reconstructed on the decoder side and do not necessarily coincide with the corresponding pixel values of the original image.

Prediction value p is then obtained according to p=a+b−c. If the value p becomes 0 or less, p=0 is set. If the value p becomes 255 or more, p=255 is set. The generated prediction value p is input to the prediction error generation circuit 102 and the pixel value reproducing circuit 108.

The prediction error generation circuit 102 obtains a prediction error D=x−p from the target pixel value x input through the signal line 109 and the prediction value p transferred from the predictor 101. The prediction error D falls within the range of −255 to 255. The quantizer 104 quantizes the prediction error D with a quantization parameter N output from the quantization parameter determination circuit 107 to generate a value Q(D), and outputs it. The value Q(D) is given by $$Q(D)=\text{floor}\{(|D|+N)/(2N+1)\}\times(D/|D|)$$

In the above equation, floor {Value} indicates the maximum integer equal to or smaller than "Value". Note that the quantization parameter N transferred from the quantization parameter determination circuit 107 is 0 at the start of image encoding. If N=0, Q(D)=D. The quantizer 104 outputs the input prediction error D without any change.

If, for example, "−3", "−2", "−1", "0", "1", "2", and "3" as prediction errors D are quantized with N=1, values Q(D) become "−1", "−1", "0", "0", "0", "1", and "1".

The pixel value reproducing circuit 108 obtains a pixel value x' reconstructed on the decoder side according to x'=p+ Q(D)×(2N+1) by using the prediction value p from the predictor 101, the value Q(D) from the quantizer 104, and the parameter N from the quantization parameter determination circuit 107. The reconstructed pixel value x' is stored in the buffer 103.

For example, the reconstructed pixel values x' obtained by dequantizing "−1", "0", and "1" as the values Q(D) are "−3", "0", and "3", respectively.

The Huffman encoding circuit 105 encodes the quantized prediction error Q(D) output from the quantizer 104 by looking up the Huffman tables held in the circuit. The Huffman encoding circuit 105 has four types of Huffman tables corresponding to the quantization parameters N=0, 1, 2, and 3.

Assume that optimal Huffman codes are generated on the basis of the distributions of prediction errors obtained by quantizing several test images with the respective parameters N in advance, and the Huffman codes are stored in these Huffman tables. FIG. 3 shows such Huffman tables.

These Huffman tables are stored in a rewritable RAM. The Huffman tables in FIG. 3 can be rewritten into other tables, as needed.

The code amount counter 106 counts the bit count of codes output to the signal line 110 to obtain a total bit count CL of the codes which have been output, and outputs the total bit count CL to the quantization parameter determination circuit 107.

The quantization parameter determination circuit 107 operates only when encoding of data corresponding to a predetermined line count L is complete. The quantization parameter determination circuit 107 determines the quantization parameter N on the basis of a target bit rate TL and the total bit count CL of codes generated until encoding of data corresponding to the predetermined line count L is complete. That is, the quantization parameter determination circuit 107 operates to switch the quantization parameters in units of bands each consisting of L lines.

The quantization parameter determination circuit 107 internally holds the quantization parameter N and an operation count I (the initial value is 0) of this circuit.

The count I is incremented by one every time circuit operation is started. That is, the count I is incremented by one every time L-line data is encoded. An encoded pixel count M is obtained from the operation count I, the line count L, and a width X of an image according to M=I×L×X. An output bit rate B is calculated from the total bit count CL input from the code amount counter 106 and the encoded pixel count M according to CL/M. A ratio r=B/TL of the output bit rate B to the target bit rate TL is obtained. If r is 1.0 or more, the quantization parameter determination circuit 107 adds 1 to the quantization parameter N held therein. If r is 0.9 or less, the quantization parameter determination circuit 107 subtracts 1 from the quantization parameter N.

If the parameter N exceeds 3, N=3 is set. If the parameter N is less than 0, N=0 is set. The quantization parameter determination circuit 107 then outputs the parameter to the pixel value reproducing circuit 108, the quantizer 104, and the Huffman encoding circuit 105. With this switching of quantization parameters, in starting encoding from the next band, code amount control is performed on the basis of the code amount accumulated up to the above band.

The above processing is repeated to perform encoding up to the last pixel input from the input unit 100. As a result, a code sequence corresponding to the input image is output to the signal line 110.

As described above, according to this embodiment, in the encoding apparatus for entropy-encoding the difference (prediction error) between a prediction value and each target pixel, the amount of encoded data can be controlled to an amount as near to a predetermined amount as possible. In addition, any deterioration in image quality can be minimized while the amount of encoded data is controlled to a predetermined data amount. Furthermore, the above deterioration in image quality can be restricted to a predetermined degree in units of pixels.

Figure 4:
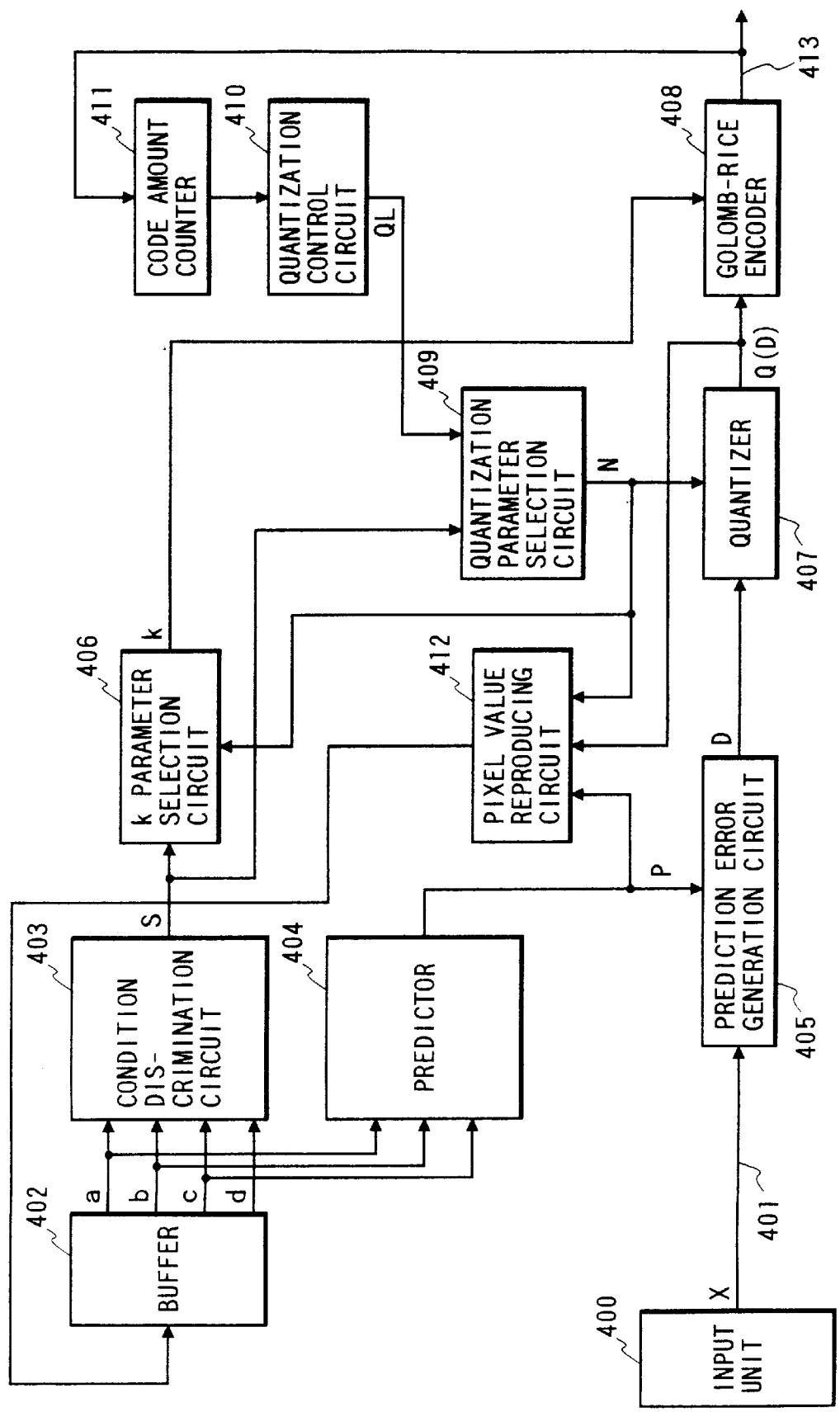
FIG. 4 is a block diagram showing the second embodiment of the present invention.

FIG. 4 shows the arrangement of the second embodiment of the present invention. Referring to FIG. 4, this embodiment includes an input unit 400 for inputting a signal, a signal line 401, a buffer 402 for storing 2-line image data, a condition discrimination circuit 403, a predictor 404, a prediction error generation circuit 405, a k parameter selection circuit 406, a quantizer 407, a Golomb-Rice encoder 408, a quantization parameter selection circuit 409, a quantization control circuit 410, a code amount counter 411, a pixel value reproducing circuit 412, and a signal line 413.

Assume that in the following description about encoding, the same processing as that in the first embodiment is performed, unless otherwise specified.

The operations of the respective components of this embodiment will be sequentially described next in a case wherein an 8-bit (0 to 255) monochrome image having a size of X pixels (horizontal)×Y pixels (vertical) is encoded. Obviously, this embodiment can also be applied to encoding of a multivalued color image. It is also an object of this embodiment to control the generated code amount per pixel to TL bits or less.

First of all, pixels to be encoded (target pixels) are input from the input unit 400 in the raster scan order and input to the prediction error generation circuit 402 through the signal line 401.

The buffer 402 stores 2-line pixels, i.e., 1-line target pixels and preceding 1-line pixels, output from the pixel value reproducing circuit 412. At the start of encoding, all the values in the buffer are set to 0.

The condition discrimination circuit 403 receives reconstructed pixel values a, b, c, and d around a target pixel from the buffer 402, and obtains differences d1, d2, and d3 according to d1=a−c, d2=c−b, and d3=b−d. These reconstructed pixel values are pixel values reconstructed on the decoder side and do not necessarily coincide with the corresponding pixel values of the original image.

The condition discrimination circuit 403 quantizes the differences d1, d2, and d3 into three conditions. A difference of 4 or more is quantized into 1; a difference of −3 to 3, 0; and a difference of −4 or less, −1. The condition discrimination circuit 403 then generates a condition number S for specifying the conditions of the neighboring pixels by using values q(d1), q(d2), and q(d3), obtained after this quantization, according to q(d1)×9+q(d2)×3+q(d3), and outputs the condition number S. The generated condition number falls within the range of 13 to −13. In general, as the condition number S increases, variations in pixel value increase. This makes it difficult for the prediction of predictive encoding to come true. The predictor 404 receives the reconstructed pixel values a, b, and c corresponding to neighboring pixels a', b', and c' around a target pixel from the buffer 402. FIG. 2 shows positions a', b', and c' of the neighboring pixels a, b, and c with respect to a target pixel x. These neighboring pixels a', b', and c' are encoded pixels with respect to the target pixel x.

The above reconstructed pixel values a, b, and c are pixel values reconstructed on the decoder side and do not necessarily coincide with the corresponding pixel values of the original image. A prediction value p is then obtained by:

max(a, b)<c, then p=min(a, b)

min(a, b)>c, then p=max(a, b)

otherwise, then p=a+b−c

If the value p becomes 0 or less, p=0 is set. If the value p becomes 255 or more, p=255 is set. The generated prediction value p is input to the prediction error generation circuit 405 and the pixel value reproducing circuit 412.

The prediction error generation circuit 405 obtains a prediction error D=x−p from the target pixel value x input through the signal line 401 and the prediction value p input form the predictor 101. The prediction error D falls within the range of −255 to 255.

The quantization parameter selection circuit 409 determines a quantization parameter N in accordance with the condition number S input from the condition discrimination circuit 403 and a quantization level QL which has been input from the quantization control circuit 410. FIG. 6 shows a table of quantization parameters N each determined on the basis of both the condition number S and the quantization level QL. Note that the initial value of QL at the start of encoding is 0.

The quantizer 407 quantizes the prediction error D in accordance with the quantization parameter N output from the quantization parameter selection circuit 409, and outputs a value Q(D). The value Q(D) is expressed as $$Q(D)=\text{floor}\{(|D|+N)/(2N+1)\}\times(D/|D|)$$

In the above equation, floor {Value} indicates the maximum integer equal to or smaller than "Value".

If, for example, "−3", "−2", "−1", "0", "2", and "3" as prediction errors D are quantized with N=1, values Q(D) become "−1", "−1", "0", "0", "0", "1", and "1".

The pixel value reproducing circuit 412 obtains a pixel value x' reconstructed on the decoder side according x'=p+Q(D)×(2N+1) by using the prediction value p from the predictor 404, the value Q(D) from the quantizer 407, and the parameter N from the quantization parameter selection circuit 409. The reconstructed pixel value x' is stored in the buffer 402.

For example, the reconstructed pixel values x' obtained by dequantizing "−1", "0", and "1" as the values Q(D) are "−3", "0", and "3", respectively.

The k parameter selection circuit 406 looks up the k parameter table (FIG. 5) held therein to output the k parameter value based on both the condition number S output from the condition discrimination circuit 403 and the quantization parameter N output from the quantization parameter selection circuit 409.

The k parameter table indicates k parameter values corresponding to different combinations of |S| and N in a form like the one shown in FIG. 5. Assume that the values of k suited for different combinations of |S| and N are checked in advance and stored in the internal memory of the k parameter selection circuit. In this embodiment, the k parameter table is not updated.

The order in which the respective values are generated in the above description will be described below. First of all, when a target pixel is input, the prediction value p and the condition number S for predicting the target pixel are generated. The quantization parameter N is then generated on the basis of the quantization level QL which has been input and the condition number S. The k parameter is generated on the basis of the quantization parameter N and the condition number S. The above processing is performed in the interval between the instant at which a target pixel is input and the instant at which the pixel is encoded by the Golomb-Rice encoder.

The Golomb-Rice encoder 408 converts the quantized prediction error Q(D) output from the quantizer 407 into a non-negative integer V, and then encodes the integer V with the parameter k output from the k parameter selection circuit 406. The quantization error Q(D) is converted into the integer V using:

$$Q(D) \geq 0, \text{ then } V=Q(D)\times 2$$

$$Q(D)<0, \text{ then } =V=-Q(D)\times 2-1$$

The non-negative integer V is encoded into a Golomb-Rice code in the following sequence.

First of all, the non-negative integer V is expressed in binary notation. The resultant data is then divided into a lower k-bit portion and the remaining upper bit portion. "0"s equal in number to the upper bit portion in decimal notation are added to the lower k-bit portion, and "1" is added to the resultant data, thus obtaining a codeword. Assume that k=2 and V=13. In this case, "0"s equal in number to the upper bit portion "11", i.e., three "0"s, are added to the lower 2n-bit portion "01" of "1101" which is the binary representation of the integer V, and "1" is added to the resultant data, thus generating a codeword "010001".

The code amount counter 411 counts the bit count of the code output to the signal line 413 to obtain a total bit count CL of the codes which have been output, and outputs the total bit count CL to the quantization control circuit 410. The quantization control circuit 410 operates only when encoding of data corresponding to a predetermined line count L is complete. The quantization control circuit 410 determines a quantization level QL from a target bit rate TL and the total bit count CL of the codes which have been generated until the end of encoding of data corresponding to the predetermined line count L.

The quantization control circuit 410 internally holds the quantization level QL and an operation count I (the initial value is 0) of this circuit. Every time the circuit is started, i.e., L-line data is encoded, the operation count I is incremented by one. The quantization control circuit 410 then obtains an encoded pixel count M from the operation count I, the line count L, and a width X of the image according to M=I×L×X. The quantization control circuit 410 calculates a current output bit rate B from the total bit count CL input from the code amount counter 411 and the encoded pixel count M according to CL/M.

A ratio r=B/TL of the output bit rate B to the target bit rate TL is obtained. If r is 1.0 or more, 1 the quantization control circuit 410 adds 1 to the quantization level QL held therein. If r is 0.9 or less, the quantization control circuit 410 subtracts 1 from the quantization level QL. If the quantization level QL exceeds 9, QL=9 is set. If the quantization level QL is less than 0, QL=0 is set. The quantization level QL is then output to the quantization parameter selection circuit 409. No quantization level QL is output until the quantization control circuit 410 operates next time. The same quantization level QL therefore remains in the quantization parameter selection circuit 409 until the quantization control circuit 410 operates next time. With this switching of quantization levels QL, in starting encoding from the next band, code amount control is performed on the basis of the code amount accumulated up to the above band.

The above processing is repeated to perform encoding up to the last pixel input from the input unit 400. As a result, the code sequence corresponding to the input image is output to the signal line 413.

As described above, according to this embodiment, in the encoding apparatus for entropy-encoding the difference (prediction error) between a prediction value and each target pixel, the amount of encoded data can be controlled to an amount as near to a predetermined amount as possible. In addition, any deterioration in image quality can be minimized while the amount of encoded data is controlled to a predetermined data amount. Furthermore, the above deterioration in image quality can be restricted to a predetermined degree in units of pixels.

The present invention is not limited to the above embodiments. For example, target pixels may be simply predicted by using preceding values, or several prediction methods may be switched as needed. Although Huffman encoding and Golomb-Rice encoder encoding are used as entropy encoding means, other entropy encoding schemes such as arithmetic encoding may be used. In this embodiment, linear quantization is used. However, the present invention is not limited to this. That is, non-linear quantization may be us ed.

In each embodiment described above, the code amount is controlled in units of bands each consisting of L lines. However, the present invention is not limited to this. For example, such control may be performed in units of lines or pixels. As the quantization parameters for code amount control are switched in smaller units, code amount control can be performed more finely.

In the above embodiments, a quantization level for a next band to be encoded (target band) is selected on the basis of the generated code amount corresponding to the preceding bands which have been encoded (encoded bands). However, the present invention is not limited to this. If a target band is temporarily encoded with a predetermined level, and the level is switched to a quantization level used for the target band on the basis of the generated code amount corresponding to the target band, the control precision can be improved. Alternatively, a quantization level used for a target band may be selected on the basis of the generated code amount corresponding to encoded bands and the generated code amount corresponding to the target band. Or such quantization levels may be switched in units of lines or pixels instead of bands.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a program code of a software program that can realize the functions of the above embodiments to a computer (CPU or MPU), in an apparatus or system, connected to various devices, and causing the computer to operate the devices in accordance with the stored program so as to realize the functions of the embodiments.

In this case, since the program code of the software program itself realizes the functions of the above embodiments, the program code itself and a means for supplying the program code to the computer, e.g., a storage medium storing the program code, constitutes the present invention.

As the storage medium storing such a program code, for example, a floppy disk, hard disk, optical disk, magneto-optical disk, CD-ROM, CD-R, magnetic tape, nonvolatile memory card, ROM, and the like may be used.

The functions of the above embodiments may be realized not only by executing the supplied program code by the computer but also by an OS (operating system) running on the computer or in corporation with other application software programs and the like. In this case as well, the program code is incorporated in the embodiments of the present invention.

Furthermore, the functions of the above embodiments may be realized by some or all of actual processing operations executed by a CPU or the like arranged in a function extension board or a function extension unit, which is inserted in or connected to the computer, after the program code read out from the storage medium is written in a memory of the extension board or unit.

According to the present invention described above, in the encoding apparatus for entropy-encoding the difference (prediction error) between a prediction value and each target pixel, the amount of encoded data can be controlled to an amount as near to a predetermined amount as possible. In addition, any deterioration in image quality can be minimized while the amount of encoded data is controlled to a predetermined data amount. Furthermore, the above deterioration in image quality can be restricted to a predetermined degree in units of pixels.

The present invention can be variously modified within the range defined by the appended claims.

What is claimed is:

1. An encoding apparatus for encoding a target pixel, comprising:

prediction means for generating a prediction value by predicting a target pixel value representing the target pixel on the basis of pixels around the target pixel;

difference generation means for generating a difference between the prediction value generated by said prediction means and the target pixel value;

quantization means for generating a quantized value by quantizing the difference generated by said difference generation means;

entropy encoding means for generating encoded data by entropy-encoding the quantized value generated by said quantization means; and quantization control means for selecting one of k quantization methods, which is to be used by said quantization means, in accordance with a code amount of the encoded data generated by said entropy encoding means, wherein each of the k quantization methods is a quantization method which makes an error between the difference generated by said difference generation means and a quantized value obtained by quantizing the difference using said quantization means fall within a range of $-N_m$ to $+N_m$ (m=1 to k).

2. An encoding method of encoding a target pixel, comprising:

the prediction step of generating a prediction value by predicting a target pixel value representing the target pixel on the basis of pixels around the target pixel;

the difference generation step of generating a difference between the prediction value generated in the prediction step and the target pixel value;

the quantization step of generating a quantized value by quantizing the difference generated in the difference generation step;

the entropy encoding step of generating encoded data by entropy-encoding the quantized value generated in the quantization step; and the quantization control step of selecting one of k quantization methods which is to be used in the quantization step in accordance with a code amount of the encoded data generated in the entropy encoding step, wherein each of the k quantization methods is a quantization method which makes an error between the difference generated in the difference generation step and a quantized value obtained by quantizing the difference in the quantization step fall within a range of $-N_m$ to $+N_m$ (m=1 to k).

3. A storage medium storing a computer-readable encoding program for encoding a target pixel, the program comprising:

the prediction step of generating a prediction value by predicting a target pixel value representing the target pixel on the basis of pixels around the target pixel;

the difference generation step of generating a difference between the prediction value generated in the prediction step and the target pixel value;

the quantization step of generating a quantized value by quantizing the difference generated in the difference generation step;

the entropy encoding step of generating encoded data by entropy-encoding the quantized value generated in the quantization step; and the quantization control step of selecting one of k quantization methods which is to be used in the quantization step in accordance with a code amount of the encoded data generated in the entropy encoding step, wherein each of the k quantization methods is a quantization method which makes an error between the difference generated in the difference generation step and a quantized value obtained by quantizing the difference in the quantization step fall within a range of $-N_m$ to $+N_m$ (m=1 to k).

* * * * *